United States Patent [19]
Wenz

[11] 3,982,919
[45] Sept. 28, 1976

[54] RETROFIT IMPROVEMENTS IN TONG HEAD ASSEMBLIES

[76] Inventor: William Wenz, 427 Carlton Ave., Millville, N.J. 08332

[22] Filed: Sept. 30, 1975

[21] Appl. No.: 618,234

[52] U.S. Cl. .............................. 65/172; 65/260; 214/147 T
[51] Int. Cl.² .................................... C03B 9/44
[58] Field of Search ............ 65/172, 357, 260, 360; 214/147 T

[56] References Cited
UNITED STATES PATENTS

| | | |
|---|---|---|
| 3,460,931 | 8/1969 | Rowe .......................... 65/360 X |
| 3,787,197 | 1/1974 | Snyder et al .................... 65/260 |

Primary Examiner—Arthur D. Kellogg
Attorney, Agent, or Firm—Charles F. Duffield

[57] ABSTRACT

A retrofit repair assembly for tong head assemblies used in glass molding equipment is disclosed which includes a pneumatic cylinder, piston and piston rod assembly directly interconnected to the scissors assembly and pneumatically interconnected to the original cylinder following removal and scrapping of the original piston, piston rod, cross head and plunger assemblies of the tong head assembly.

2 Claims, 4 Drawing Figures

RETROFIT IMPROVEMENTS IN TONG HEAD ASSEMBLIES

BACKGROUND OF INVENTION

Glass molding equipment in common use in the world for many years employ what is commonly called tong head assemblies which are pneumatically operated and which grasp the blown glassware, such as bottles, for movement from one place to another. A typical cross head assembly of the type being described is illustrated in FIG. 1 of the drawing.

The typical tong head assembly includes a cylinder body 10 to which a tong holder guide bracket 11 is mounted. The tong holder guide bracket 11 provides the support for a pair of scissors tong assemblies 12 carried upon a guide pin 13. In some applications, the tong holder guide bracket 11 will provide the support for three tong assemblies 12.

Each tong assembly 2 is actuated by a plunger 14 which is interconnected at its lower end to the scissors assembly and which extends upwardly above the tong holder guide bracket through a guide bushing 15. A compression spring 16 and retaining washer 17 maintain the plunger 14 extended and in place.

A cylinder 18 is positioned above the cylinder body 10. The cylinder 18 includes a piston 19 and its associated piston rod 20 extending through a guide aperture in the cylinder base 21.

The lower portion of the piston rod 20 is directly interconnected to the central portion of a cross head 22 positioned below the cylinder base 21. The cross head 22 includes arms 23 which extend outwardly to a position above each plunger 14. Adjusting screws 24 provide the necessary adjustment for accommodation and wear and varying lengths of the plungers 14.

The tong head assembly is supported in place within the molding equipment by means of an axle (not shown) which interconnects with the upper portion of the cylinder 18 centrally through a drive sprocket 25. The axle includes a central bore therein which is in pneumatic communication with the upper portion of the cylinder 18.

At predetermined times in the machine cycle, pneumatic pressure is applied to the top of the piston 19. As this occurs, the piston 19 is forced downwardly which, in turn, actuates the cross head and plungers 14 to close the tong assemblies 12. Release of the pneumatic pressure, under action of the springs 16, causes the piston 19 to be returned and the tong assemblies 12 to be opened.

One of the inherent problems of tong head assemblies of this type arises out of the simultaneous actuation of both plungers and tong assemblies. Often a piece of glassware will not be engaged properly by one of the tong assemblies. When this occurs, the tongs associated with the tong assembly will not completely close thus preventing the plunger 14 from being completely depressed. The result of this is that the cross head cannot completely extend and consequently the other plunger and tong assembly will not operate fully.

The conventional tong head assemblies, as any piece of equipment, will eventually wear with repeated use. Wear is pronounced in the cylinder area and particularly in the piston rod guide aperture in the cylinder base 21. Additionally, the guide bushings 15 wear considerably under the repeated actuation of the plungers 14.

Whenever the wear in the cylinder and the various guide areas become too great, the assembly must be torn down and rebuilt. Often the expense of machining the guides and cylinder and providing the necessary repairs, exceeds the value of new replacement parts. Accordingly, it is often common practice to simply scrap the cylinder, cylinder body with its integral cylinder base and the tong holder guide bracket.

OBJECT AND SUMMARY OF INVENTION

It is the object of the present invention to provide improvements in the way of assemblies which provide a retrofit repair kit for tong head assemblies which will permit the salvage of cylinders, cylinder bodies and tong holder guide brackets heretofore scrapped.

In accordance with the present invention, the original piston and piston rod are removed from the cylinder and discarded. Additionally, the cross head, plunger and compression springs are likewise discarded.

A pneumatic cylinder is provided for each scissor assembly of the tong holder assembly. The pneumatic cylinder is directly mounted upon the tong holder guide bracket immediately above the scissors tong assembly. The cylinder includes a piston and extended piston rod. The lower end of the piston rod is directly connected with the scissors tong assembly.

A pneumatic air line assembly is provided and directly connects the pneumatic cylinders with the top interior of the original cylinder of the tong head assembly. The original cyliner is plugged to pneumaticaly seal the cyliner to permit the original pneumatic control pressure to be transmitted to the newly added pneumatic cylinders.

Other objects and advantages of the present invention will become apparent to those skilled in the art from the detailed description which follows taken in conjunction with the drawing.

DETAILED DESCRIPTION OF DRAWING

DESCRIPTION OF INVENTION

Figure 1:
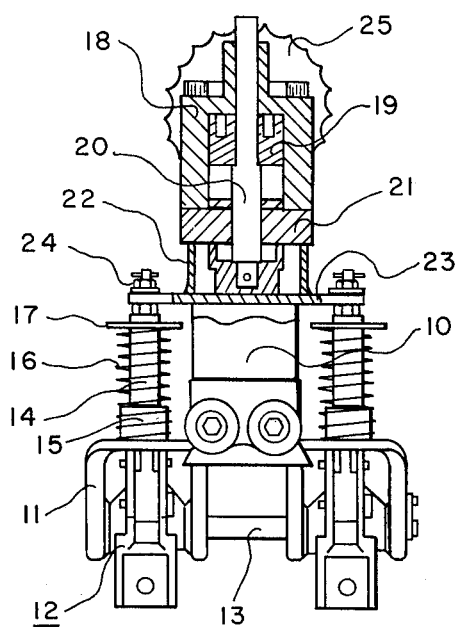
FIG. 1 is a side view of a tong holder assembly as known in the prior art.

In accordance with the present invention, an existing tong head assembly which has been taken out of service, will be torn down and the piston 19 and the piston rod 20 removed. Additionally, the cross head 22, plungers 14, springs 16 and retaining washers 17 will likewise be discarded.

Figure 2:
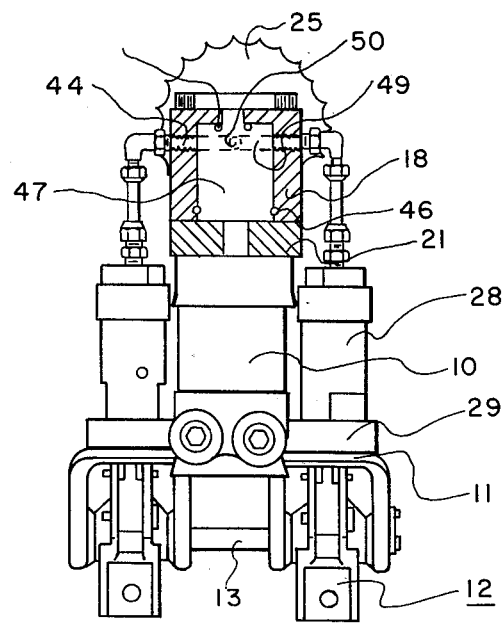
FIG. 2 is a side view of a tong holder assembly modified in accordance with the present invention.

As best seen in FIG. 2, the cylinder cavity will be plugged with a cylindrical lug 46 which utilizes O-rings 47 and 48 at the bottom and top thereof respectively to seal the cylinder. The plug 46 includes a drilled air passage 50 in communication with the central bore of the axle and also interconnects with a cross-drillling 49. The cylinder 18 will thus be pneumatically sealed and the pneumatic control pressure theretofore applied to the cylinder will be allowed to pass through the plug to the pneumatic cylinders forming a part of this invention as hereinafter described.

Figure 3:
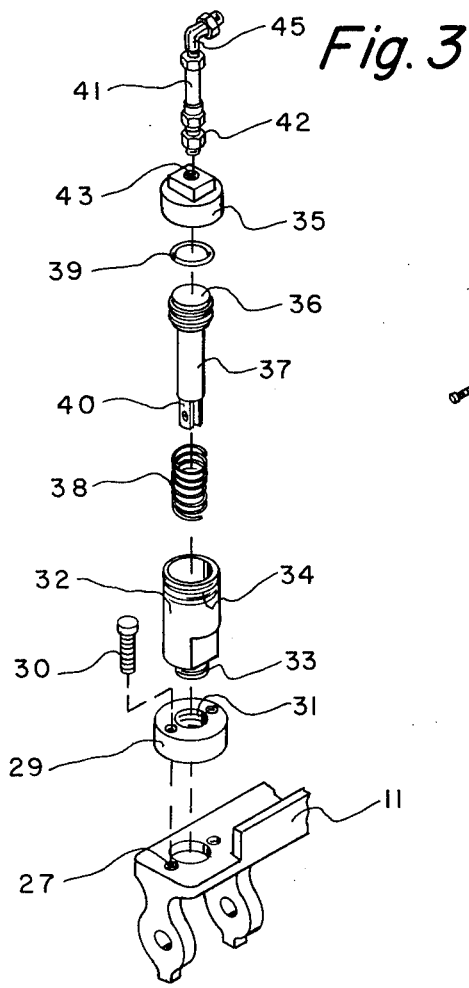
FIG. 3 is an exploded perspective view of the details of the pneumatic cylinder of the present invention.

Certain machining work must also be done to the tong holde guide bracket 11. As best seen in FIG. 3, the guide bushing 15 originally positioned on the tong holder guide bracket is machined to a flat surface. Two tappd holes 27 are then provided on either side of the remaining portion of the guide bushing.

In accordance with the present invention, a pneumatic cylinder assembly 28 is provided. The assembly 28 includes a cylinder mounting spacer 29 as best shown in FIG. 3. The cylinder mounting spacer 29 is adapted to be secured in place on the tong holder guide bracket 11 by means of two cap screws 30 which pass through appropriate drilled holes in the spacer. Additionally, the cylinder mounting spacer 29 includes a threaded aperture 31 centrally thereof.

The cylinder assembly further includes a cylinder body 32. The lower portion of the cylinder body includes a threaded portion 33 of reduced section which is adapted to be threaded into the threaded aperture 31 of the cylinder mounting spacer 29. Additionally, the upper portion 34 of the cylinder includes an external thread thereon onto whch a cylinder head 35 is threaded.

Internally, the cylinder assembly includes a piston 36 and its associated piston rings. The piston is interconnected to an elongate piston rod 37 which extends through a guide aperture (not shown) in the lower projection 33 of the cylinder.

A compression return spring 38 is provided and is adapted to surround the piston rod 37 underneath the piston 36 to provide a return pressure upon the piston 36. An O-ring 39 is utilized between the cylinder head 35 and the top portion 34 of the cylinder to provide a pneumatic seal between the cylinder head and the cylinder and also to absorb the return impact of the piston against the cylinder head 35.

Figure 4:
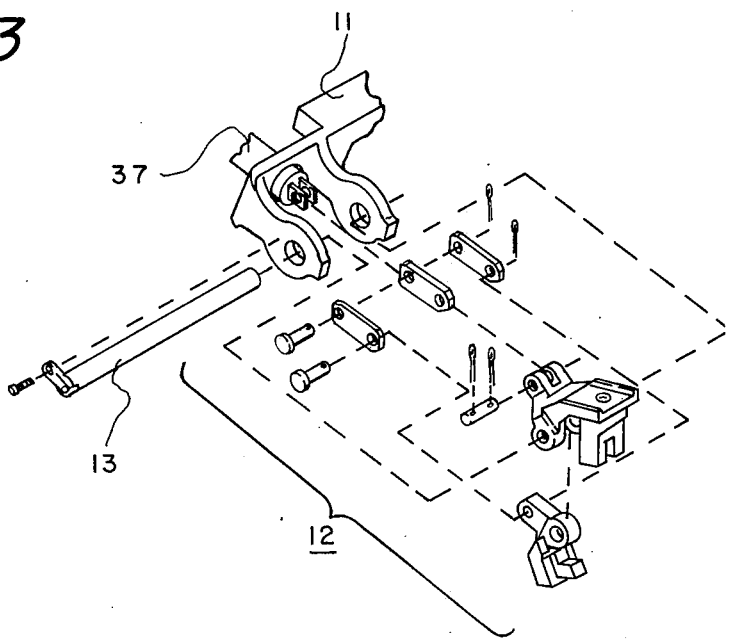
FIG. 4 is an exploded perspective view of the scissors tong assembly.

During assembly, the cylinder mounting spacer 29 is first fixed in place. Thereafter, the bifurcated lower end 40 of the piston rod 37 is interconnected into the scissors tong assembly 12 as best shown in FIG. 4, in the conventional manner employed in the tong head assemblies of the prior art. Thereafter, the cylinder assembly is threaded in place upon the cylinder mounting spacer 29.

Once the cylinder assembly is secured in place upon the tong holder guide bracket 11, shown in FIG. 2, it is then pneumatically interconnected to the original cylinder 18. This is accomplished by means of an air line assembly 41. This assembly includes a lower threaded connection 42 which is threaded into a corresponding threaded aperture 43 in the top of the cylinder head 35.

At this point, an aperture 44 is drilled and tapped into the side of the cylinder 18 completely through to the interior of the cylinder and in alignment with the cross-drilling 49. Thereupon, a threaded fitting 45 of the air line assembly 41 is threaded into the aperture 44.

The tong holder assembly, once repaired with the retrofit assembly of the present invention, may then be returned to service utilizing the cylinder, cylinder body and tong holder guide bracket which would normally theretofore have been discarded. The repaired tong holder assembly will then operate as the original, i.e. the pneumatic control pressure appearing at the cylinder 18 as before will operate the independent cylinder assemblies in accordance with the same time sequence as the original single piston assembly. The additional advantage is acquired in that the tong assemblies will be operated independently thus avoiding the problem of disabling both tong assemblies in the event that one of them is jammed. Further yet, in those cases where it may be desirable to permanently lock out one of the tong assemblies, this can be conveniently done simply by blocking one of the air line assemblies.

From the foregoing, it will be appreciated that the improvements of the present invention provide for a novel retrofit repair and alteration of tong head assemblies heretofore known while permitting the use of parts thereof which would normally be scrapped and also providing improvements in the operation of the repaired assembly.

It is to be appreciated that the description of the invention was taken in respect to a particular embodiment thereof shown in the drawing. For example, it is contemplated that the invention can be equally applied to take out tong head assemblies having three scissor tong assemblies. Thus, other modifications and variations of the invention wll now become apparent to those skilld in the art in view of the detailed description thereof which preceded. Accordingly, it is to be understood that no limitation as to the scope of the invention was intended by the description thereof in respect to the particular embodiment shown.

I claim:
1. In glass molding equipment employing a pneumatically operated take-out tong head assembly of the type utilizing a centrally disposed cylinder with included piston and piston rod assembly operating a cross head which, in turn, simultaneously operates at least two spring biased plunger assemblies each interconnected for operation of a scissors tong assembly mounted in a tong holder guide bracket, the improvements for repair and alteration of the assembly comprising:
   a pneumatic cylinder assembly including a cylinder, piston and piston rod adapted for direct mounting of the cylinder upon the tong holder guide bracket and direct interconnection of the piston rod to the scissors tong assembly following removal of the original cross head and plunger assemblies; and
   means pneumatically interconnecting the pneumatic cylinder with the original centrally disposed cylinder whereby the original pneumatic control to the tong head assembly will be transmitted to the pneumatic cylinders for independent for independent operation of the scissor tong assemblies.

2. The improvements of claim 1 wherein the original piston and piston rod assembly are removed and the cylinder pneumatically sealed.

* * * * *